United States Patent Office 3,145,195
Patented Aug. 18, 1964

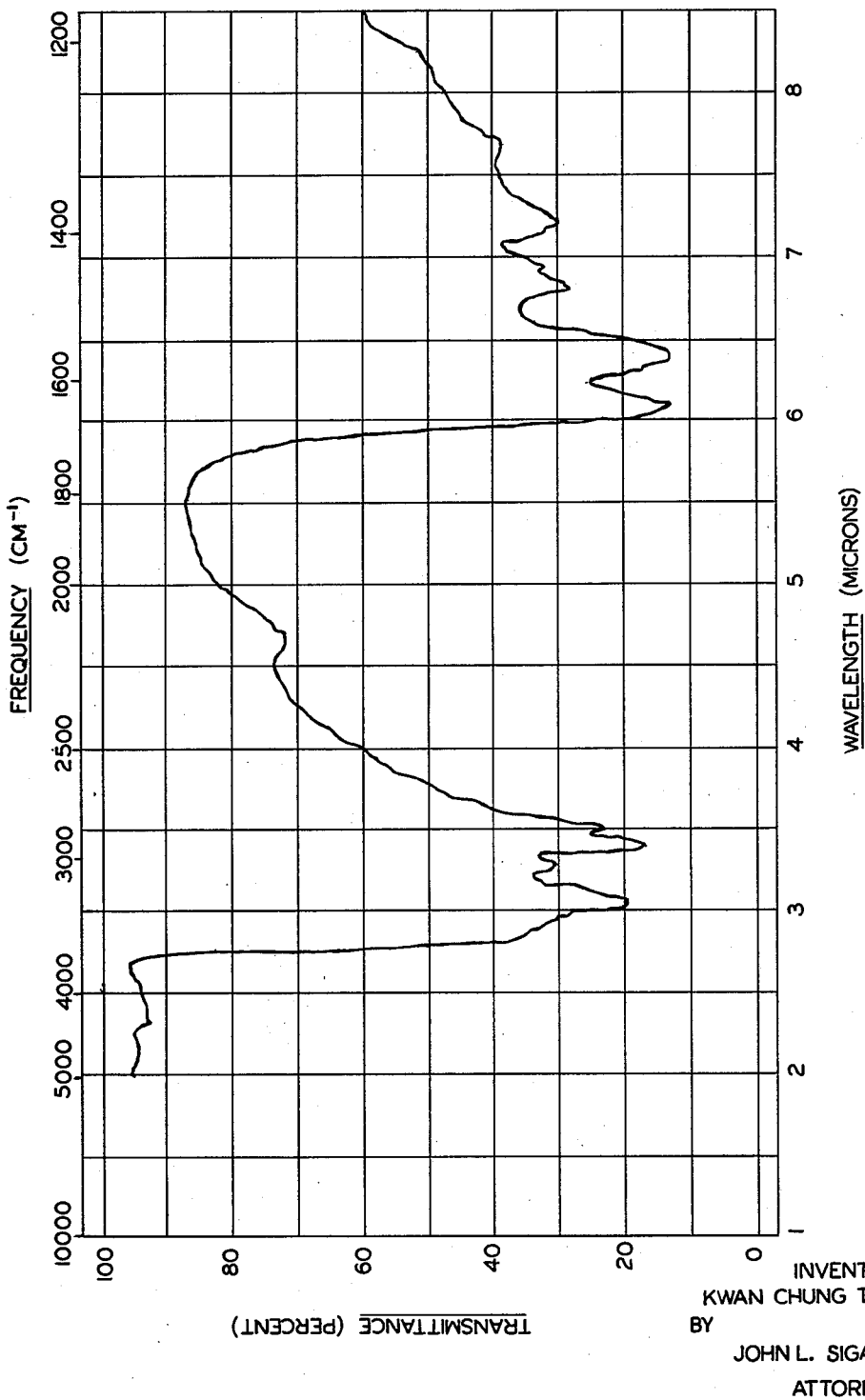

3,145,195
POLYAMIDE RESINS AND PROCESS
Kwan C. Tsou, Huntingdon Valley, Pa., assignor to The Borden Company, New York, N.Y., a corporation of New Jersey
Filed May 25, 1960, Ser. No. 31,571
3 Claims. (Cl. 260—86.1)

This invention relates to high molecular weight linear thermoplastic polyamide resins which are useful as adhesives. More particularly, this invention is directed to new polyamide resins prepared from the reaction of polyamines with acrylic esters and to the process of making these resins.

The polyamide resins of the present invention are linear condensation and addition polymers which are viscous polymeric oils. The resins can be formed into fibers but are particularly suitable as wet strength adhesives that can be cured with formaldehyde, dimethylol urea, and epoxide compounds such as epichlorohydrin, butadiene epoxide, and vinyl cyclohexene epoxide, and other conventional curing agents. Moreover, dependent upon the type of polyamine used the resins of the present invention may be either water-soluble or water-insoluble permitting a wide range of applications as adhesive or fiber forming materials.

Briefly stated, the present invention comprises the herein described process in which an acrylic ester and a polyamine are reacted in a polar medium at temperatures of 30° C. or below. The invention also comprises the polyamide resins produced by this process.

FIGURE 1 in the attached drawing shows the infrared absorption spectrum of a polymer of the present invention.

In general, the process of the invention comprises admixing substantially equimolar proportions of an acrylic ester and a polyamine in a polar medium and reacting the mixture at the polymerization temperature. The polymerization can be carried out in any suitable reaction vessel having means to control the temperature of the reactants. The molar proportion of ester to polyamine can be varied from about 0.2–3 moles of the ester to 1 of the polyamine, but the yield of polymer is not as great as when equimolar proportions are used. Further, too large a molar excess of the esters inhibits the formation of polymers of the present invention and results only in monomer and dimer formation. After the polymerization reaction is complete the polymer is purified by stripping off the polar medium and any unreacted materials. The order of addition of the reactants is not critical but since the reaction is exothermic it is preferred to add the polyamine to the ester in several increments to avoid excessive heat.

The reaction is conducted at temperatures of 30° C. to about −20° C., and for best results at temperatures ranging from 0° to 15° C. Temperatures much above 30° C. result in low molecular weight polyamides. It has been found that temperatures above 75° C. result in cross-linked networks and not true linear addition and condensation polyamides of the present invention.

The time required for the reaction will vary from several hours to several days dependent upon the temperature and other conditions used. Working at 0° C. with water as the polar medium about 8 hours are required for completion of the reaction.

It is important to use a polar medium such as water or methanol. Although the exact mechanism of the polyamide formation of the present invention has not been completely determined, it is considered that the use of such polar medium greatly increases the rate of the transamidation reaction (formation of amide) and thus makes possible the formation of the high molecular weight linear polyamide resins of the present invention.

The polyamide resins have a viscosity about 5,000 cps. to about 100,000 cps. Resins of higher viscosity can be prepared if desired. The most suitable adhesives are prepared from polymers having a viscosity of about 100,000 cps.

As to materials, the acrylic esters used are those corresponding to the formula:

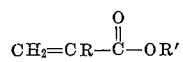

wherein R represents hydrogen or a methyl or ethyl group and R' represents an alkyl group having 1–5 carbon atoms or a $C_6$–$C_8$ aryl group selected from the group consisting of phenyl, benzyl, cresyl, and xylyl groups. Examples of suitable esters are methyl, ethyl, isobutyl, and phenyl acrylates and the corresponding methacrylates and ethacrylates, and propyl, butyl, and cresyl methacrylate and the corresponding acrylates and ethacrylates. Of these esters, methyl acrylate and methyl methacrylate are preferred because they react most rapidly with the polyamine.

The polyamine employed may be either aromatic or aliphatic dependent upon the solubility desired of the polyamide. Polyamides of the present invention made with aromatic polyamines are generally water-insoluble and those made with aliphatic polyamines are water-soluble.

Specific examples of suitable aromatic polyamines are o-, m-, and p-phenylenediamine, m- and p-tolylenediamine, benzidine and o-tolidine.

The aliphatic polyamines are selected from the group consisting of diamines, triamines, tetramines, and pentamines. Of these the diamines are preferred.

Typical examples are diethylenetriamine, triethylenetetramine, tetraethylenepentamine, 1,3-diaminobutane and amines corresponding to the formula

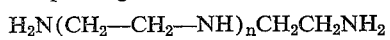

where $n$ is an integer from 1–3.

The preferred diamines include those having a formula selected from the group consisting of

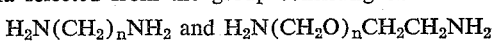

where $n$ is an integer from 2–10. Examples are ethylenediamine, tetramethylenediamine, hexamethylenediamine, and decamethylenediamine.

FIGURE 1 of the drawing shows the infrared absorption spectrum of the polymer formed by reacting hexamethylenediamine and methyl acrylate as set forth in Example 2 herein. There is no ester band indicating the absence of any polyacrylic ester formation. Instead there are amide bands at wave lengths 6.1 and 6.4 micron pair and a secondary amine band at wave length 3.0 microns indicating that the termination of the polymer is a diamide formation and that a true addition and condensation reaction has taken place. The amide bands and secondary amine band are present in all of the polyamide resins of the present invention as is the absence of an ester band.

The invention will be further illustrated by description in connection with the following specific examples.

*Example 1*

1.6 moles of methyl acrylate were placed in a reactor equipped with a stirrer and thermometer. The reactor had means for cooling the same to the temperature desired. The methyl acrylate in the reactor was cooled to 0° C. and 1.6 moles of hexamethylenediamine, in the form of a 70% aqueous solution, was added dropwise and the temperature was maintained at about 5° C. On the completion of the addition the temperature of the reaction mixture was allowed to rise to room temperature. 200 ml. of water was then added and reaction mixture stripped of methanol under reduced pressure. A viscous white polymeric oil remained which was a water-soluble polyamide having excellent adhesive properties.

This polymer was used to adhere glass plates together by pressing the polymer between two glass plates and curing with formaldehyde, epoxide curing agents and dimethylol urea. In every instance a firm, water-insoluble bond was formed.

The polyamide resin provided equally excellent results when used as an adhesive for materials such as paper, wood, plastic, packaging film and the like materials.

*Example 2*

138 grams, or 2 moles, of methyl acrylate was placed in a reactor as described in Example 1, and 100 ml. of water was added as the polar medium.

Hexamethylenediamine (263 grams or 2.3 moles, 70% aqueous solution) was added dropwise to the methyl acrylate in 100 ml. water at 0–15° with stirring. The mixture was allowed to stand at room temperature overnight and stripped of the water and methanol formed. The aqueous methanol was collected in a Dry-Ice acetone trap at 3 mm. A viscous oil remained.

The product collected in the trap was water-soluble, weighed 119.5 grams, and had a $D=0.923^{27}$ corresponding to 42% methanol, equivalent of 52 grams (theory 51 grams).

The viscosity of the polymeric oil was Brookfield 7931 (spindle No. 7, speed 20 r.p.m.) and infrared spectroscopy of the polymer, as noted above, showed an amide band and secondary amine band but no ester band.

The polyamide resin was used as an adhesive and was cured with epoxide curing agents to form strong bonds.

*Example 3*

100 grams of methyl methacrylate was placed in a flask as described in Example 1. 116 grams of hexamethylenediamine (70% aqueous solution) was added at 5° C. and the resulting mixture was then distilled to remove the methanol and the residue was placed into another flask and heated under vacuum. When the bubbling ceased the liquid was poured out and allowed to cool yielding an amber, clear, thermoplastic water-soluble polyamide.

The polymer was somewhat hygroscopic and resembled rosin in the solid state. Fibers as long as 30 feet were drawn by touching a stirring rod to the molten material. The fibers formed, which were water-soluble, were cured with a variety of conventional curing agents to yield strong, usable fibers.

*Example 4*

M-phenylenediamine was substituted in equal amount for the hexambethylenediamine of Example 1, the reaction and procedure otherwise being the same as in Example 1. After distillation a thermoplastic polyamide resin was obtained which was water-insoluble and of a darker color than the resin produced in Example 1.

*Example 5*

Diethylenetriamine (234 g.) was substituted for the hexamethylenediamine of Example 2, the reaction and procedure otherwise being the same as in Example 2.

The resultant polyamide resin was cured with epichlorohydrin to provide a wet-strength material.

*Example 6*

The procedure as set forth in Example 1 is followed except that methyl, butyl, and cresyl ethacrylate, isobutyl, phenyl and ethyl methacrylate, and ethyl, propyl, benzyl, and xylyl acrylate are substituted for the methyl acrylate. The reaction is slower but the corresponding polyamides are formed.

*Example 7*

The procedure as set forth in Example 1 is followed except that triethylenetetramine, tetraethylenepentamine, 1,3-diaminobutane, ethylenediamine, tetramethylenediamine, and decamethylenediamine are substituted for the hexamethylenediamine. In all instances substantial yields of the corresponding water-soluble polyamides are obtained.

*Example 8*

The procedure as set forth in Example 8 is followed except that o- and p-phenylenediamine, m- and p-tolylenediamine, benzidene, and o-tolidine are substituted for the m-phenylenediamine. The corresponding water-insoluble polyamides are produced.

The precise mechanism and termination step for the polymers of the present invention have not been determined exactly but the polymer backbones are considered to have the following recurring structural unit:

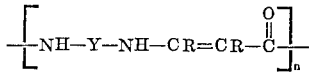

wherein —NH—Y—NH— represents the polyamine moiety, R is a member of the group consisting of hydrogen and a $C_1$–$C_2$ alkyl group, and $n$ a number greater than 2.

It will be understood that it is intended to cover all changes and modifications of the examples of the invention herein chosen for the purpose of illustration which do not constitute departures from the spirit and scope of the invention.

I claim:

1. The method of making a water soluble liquid linear polyamide resin having a viscosity of about 5,000 to 100,000 cps., comprising forming a mixture of substantially equimolar proportions of polyamine containing at least two primary amino groups and an acrylic ester having the formula

wherein R is a component selected from the group consisting of hydrogen and $C_1$–$C_2$ alkyl groups and R' is a monovalent hydrocarbon radical selected from the group consisting of $C_1$–$C_5$ alkyls and $C_6$–$C_8$ aryls in a polar medium selected from the group consisting of water and methanol and maintaining the said mixture at a temperature ranging from —20° to 30° C. until the reaction that ensues is substantially completed.

2. The method as set forth in claim 1 wherein the acrylic ester is methyl acrylate.

3. A polyamide resin produced by the process of claim 1.

References Cited in the file of this patent

UNITED STATES PATENTS

| | | |
|---|---|---|
| 2,146,210 | Graves | Feb. 7, 1939 |
| 2,176,074 | Jacobson | Oct. 17, 1939 |
| 2,629,708 | Uraneck et al. | Feb. 24, 1953 |
| 2,845,408 | Melamed | July 29, 1958 |
| 3,017,435 | Coffman et al. | Jan. 16, 1962 |